Figures 1, 2, 3, 4:
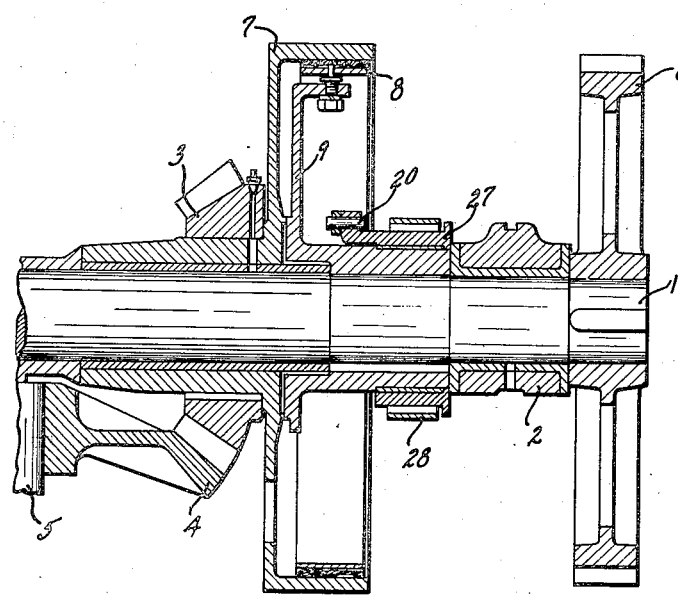

April 16, 1935.  R. H. ZEILMAN  1,997,806

CLUTCH MECHANISM

Filed Nov. 17, 1930

INVENTOR
Roy H. Zeilman
BY
Brockett, Hyde, Higley & Meyer
ATTORNEYS

Patented Apr. 16, 1935

1,997,806

UNITED STATES PATENT OFFICE 1,997,806

CLUTCH MECHANISM

Roy H. Zeilman, Elyria, Ohio, assignor to The Thew Shovel Company, Lorain, Ohio, a corporation of Ohio Application November 17, 1930, Serial No. 496,215

10 Claims. (Cl. 192—36)

My invention relates to a clutch mechanism. It relates, particularly, to a clutch mechanism of the type embodying what is termed as a booster drum and brake band for moving the clutch parts into operative engagement, the clutch embodying the usual drum and clutch band that may be either of the expanding or contracting type.

Heretofore, there has been considerable difficulty with clutches of the drum and band type in arranging the parts and the operating speed so that the so-called "chattering" would be done away with. Such "chattering" is usually due to a grabbing and release action between the band and the drum caused by vibration or oscillation of the operating parts and, therefore, the clutch band, and results in undue wear and strain on all the operating parts.

My invention contemplates the provision of a means for eliminating the "chattering" action, this means taking the form of a snubber or retarder of the friction cushion and spring type, such snubber or retarder being adapted to cause a relatively slow and a steady movement of the friction band into or out of engagement with the clutch drum and without oscillation or vibration of the band.

Various objects and advantageous features may be seen in the following description and one embodiment thereof may be seen in the accompanying drawing wherein similar characters of reference designate corresponding parts, and wherein:

Fig. 1 is a sectional view showing a clutch mechanism that may be constructed in accordance with my invention in combination with a shaft that forms a part of a swing mechanism; Fig. 2 is an elevation of a clutch band and operating parts constructed in accordance with my invention; Fig. 3 is a sectional elevation of the friction cushion or snubber device; and Fig. 4 is a sectional view taken on the line 4—4 of Fig. 3.

Referring to the drawing, I have shown, in Fig. 1, a part of the operating mechanism usually found in power shovels or the like including a horizontal swing shaft I mounted in fixed bearings 2 and carrying a bevel gear 3 loosely mounted thereon and cooperating with a bevel gear 4 that is rigidly mounted on a vertical swing shaft 5. Under certain conditions, that is, when the horizontal swing shaft I which is continuously rotated through a driving gear 6 is clutched to the bevel gear 3 through the medium of a clutch drum 7 also loosely mounted on the shaft and rigidly attached to the bevel gear 3 and a clutch band 8 operated in a manner hereinafter described, the vertical swing shaft 5 which is ordinarily stationary will be rotated to operate a turn table, swinging frame, or the like.

As shown in Fig. 2, the clutch band 8 is mounted on a frame including a spider 9, the clutch band being attached as at 10 to one of the spider arms and guided through the remainder of its length by adjustable guide plates 11 disposed at various points around the inner circumference of the band. A spider 9 is rigidly mounted on the horizontal swing shaft I and the free end of the band 8 is connected to the spider by means of a toggle link 12 pivotally connected as at 13 to the free end of the band and pivotally connected as at 14 to the spider.

The free end of the clutch band 8 is also connected to one end 15 of a bell crank 16 fulcrumed on the spider 9 as at 17 by means of two adjusting eye-bolts 18 having right and left hand threads respectively and connected together by a nut 19 whereby the throw of the bell crank relative to the band may be adjusted. At its opposite end, the bell crank 16 is connected to a pin 20 of a booster drum mechanism, hereinafter described, by means of a link 21. With this construction, a downward pull on the link 21 will cause downward movement of the long end of the bell crank 16 and movement of the short end 15 thereof to the left as shown in Fig. 2 which will increase the circumference of the band 8 as will be readily apparent or, in other words, will expand the band until the outer fabric or composition coating that normally forms a part of every clutch band is moved into engagement with the inner periphery of the drum 7 whereby the drum and bevel gear 3 will be rotated at the same rate of speed as the horizontal swing shaft I since the clutch band is rigidly mounted on the horizontal swing shaft. Thus, the vertical swing shaft 5 will be rotated to cause movement of the swinging frame or other parts which it drives. A release means consisting of a rod 22 extending loosely through an extension 23 on the spider 9 and through an angle 24 on the inner periphery of the clutch band 8 and having a spring 25 interposed between the extension 23 and adjusting nuts 26 on the lower end of the rod is provided to cause contraction of the band 8 when the downward pull of the link 21 is relieved, the spring 25 being compressed as the band 8 is expanded in the manner just described.

The means for operating the clutch band or causing a downward pull on the link 21 consists of a drum 27 mounted on the hub of the spider 9 which is rigidly mounted on the shaft I in such manner that the drum will normally rotate with the spider 9 due to friction and its connection with the link 21 without exerting sufficient pull on the link 21 to cause expansion of the band 8 but may be held against rotation with the spider 9 and shaft 1 to cause a downward pull on the link 21 due to retarding of the rotation of the drum 27. An ordinary brake band 28 is provided around the drum 27 and a suitable operating means (not shown) is provided for contracting the band 28 to grip the drum 27 in such manner as to retard its rotation but still permit slipping of the drum when the pull thereon is sufficient to overcome the friction between the drum and brake band.

In accordance with my invention, a means is provided for causing a steady movement of the band 8 into and out of engagement with the inner periphery of the drum 7 whereby any grab and release action due, in most instances, to vibration of operating parts will be eliminated and "chattering" prevented. This means consists of what may be termed a snubber embodying a rod 29 pivotally connected to the outermost end of the long arm of the bell crank 16 as at 30 and extending loosely downwardly through a sleeve 33 in the spider 9 and surrounded by a spring 31 that is interposed between a collar 32 on the rod and the sleeve 33 in the spider. Thus, downward movement of the bell crank 16 is resisted by compression of the spring 31 and on release of the downward pull on the bell crank it is moved upwardly by the tendency of the spring to return to its normal position. In addition to the resistance afforded by the spring 31 a smaller spring 34 surrounds a reduced portion 35 of the rod 29 with its one end bearing against the shoulder 36 formed by the reduction in the rod. The opposite end of this spring 34 bears against the upper end of a plurality of tapered collets 37 that are disposed in an annular tapered seat formed in the sleeve 33. Thus, when the rod 29 is moved downwardly by downward movement of the bell crank 16 which expands the band 8 into engagement with the drum 7, the tapered collets 37 will be forced downwardly into the tapered seat in the sleeve 33 and, since the inner surface of the collets bear against the outer periphery of the shaft 29, a wedging action will be produced which will retard downward movement of the rod 29 or upward movement of the rod after it has been moved to the lowermost extent desired, the upward movement being resisted by the drag of the collets wedged against the shaft and held by the downward force exerted by the still compressed spring 34. Thus, the movement of the bell crank 16 in either direction is substantially retarded or resisted which will produce a relatively steady movement of the bell crank and prevent a grab and release action of the band 8 with relation to the drum 7 which produces chattering.

With this construction, I have provided a clutch that has the advantage of being more positive in action than the usual clutch of the drum and band type due to the fact that vibration or oscillation of the clutch band will be eliminated regardless of the presence of amount of oscillation or vibration of the operating parts for the band. Together with this, the band will move into and out of engagement with the drum with a slow and steady movement due to the friction retarding action increasing in effectiveness as the band approaches drum engaging position whereby intermittent grab and release action during the time the band is being moved into operative engagement with the drum will be further done away with. This is accomplished by the snubber or friction cushion shown and described. It will be understood that such snubber or friction cushion may be as readily applied to a clutch band of the contracting type as to the expanding type shown.

What I claim is:

1. Apparatus of the class described comprising a clutch drum, a clutch band adapted to be moved into engagement with said drum, means for moving said band into drum-engaging position, and a retarding means including a friction cushion effective on said band-moving means to increasingly retard the movement of said band toward drum-engaging position as said band approaches said drum.

2. Apparatus of the class described comprising a clutch drum, a clutch band adapted to be moved into engagement with said drum, means for moving said band into drum-engaging position, a retarding means including a friction cushion effective on said band-moving means to increasingly retard the movement of said band toward drum-engaging position, and resilient means for resisting movement of said band toward drum-engaging position.

3. Apparatus of the class described comprising a clutch drum, a clutch band adapted to be moved into engagement with said drum, means for moving said band into drum-engaging position, means including a rod operatively connected with said band for retarding movement of said band into drum-engaging position, a friction cushion for said rod and resilient means for resisting movement of said rod toward engaged position and urging said rod toward disengaged position.

4. Apparatus of the class described comprising a clutch drum, a clutch band adapted to be moved into engagement with said drum, means for moving said band into drum-engaging position, means including a rod operatively connected with said band and a sleeve member about said rod for retarding movement of said band into drum-engaging position, means moved into wedging position between said rod and said sleeve member by movement of said band and rod toward engaged position, and resilient means for resisting movement of said rod toward engaged position.

5. Apparatus of the class described comprising a clutch drum, a clutch band adapted to be moved into engagement with said drum, means for moving said band into drum-engaging position, means including a rod operatively connected with said band and a sleeve member about said rod for retarding movement of said band into drum-engaging position, a plurality of tapered collets movable into wedging position between said rod and said sleeve member by movement of said rod and band toward engaged position, and resilient means for resisting movement of said rod toward engaged position.

6. Apparatus of the class described comprising a clutch drum, a clutch band adapted to be moved into engagement with said drum, band-moving means including a drum rotatable with said band, interconnecting mechanism between said last named drum and said band for moving said band into drum-engaging position when rotation of said last named drum is retarded, means for retarding rotation of said last named drum, a retarding means including a friction cushion effective on said band-moving means to increasingly retard the movement of said band toward drum-engaging position, and means for moving said band out of engagement with said drum.

7. Apparatus of the class described comprising a clutch drum, a clutch band adapted to be moved into engagement with said drum, band-moving means including a drum rotatable with said band, interconnecting mechanism between said last named drum and said band for moving said band into drum-engaging position when the rotation of said last named drum is retarded, means for retarding the rotation of said rotatable drum, means for retarding movement of said band into engagement with said drum including a rod operatively connected to said band and a friction cushion rendered increasingly effective on said rod by movement of said band toward drum-engaging position, and means for moving said band out of drum-engaging position.

8. Apparatus of the class described comprising a clutch drum, a clutch band adapted to be moved into engagement with said drum, band-moving means including a drum rotatable with said band, interconnecting mechanism between said last named drum and said band for moving said band into drum-engaging position when the rotation of said last named drum is retarded, means for retarding the rotation of said last named drum, means for retarding movement of said band into drum-engaging position including a rod operatively connected with said band, a sleeve member about said rod and a plurality of tapered collets movable into wedging relation between said rod and said sleeve member by movement of said band and rod towards drum-engaging position, and resilient means for resisting movement of said band toward drum-engaging position.

9. Apparatus of the class described, comprising a clutch drum, a clutch band adapted to be moved into engagement with said drum, means for moving said band into drum-engaging position, means for retarding movement of said band into drum-engaging position and urging said band toward release position, and means for retarding the action of said last named band-moving means.

10. Apparatus of the class described, comprising a clutch drum, a clutch band adapted to be moved into engagement with said drum, means for moving said band into drum-engaging position, means for retarding movement of said band into drum-engaging position and urging said band toward release position, and means operable by said band urging means for retarding the action thereof upon said band.

ROY H. ZEILMAN.